US010905103B1

(12) United States Patent
McKiver

(10) Patent No.: US 10,905,103 B1
(45) Date of Patent: Feb. 2, 2021

(54) DEVICE FOR ASSISTING APPLICATION OF MEDICAMENTS TO PETS

(71) Applicant: Kyle Edward McKiver, Ipswich, SD (US)

(72) Inventor: Kyle Edward McKiver, Ipswich, SD (US)

(*) Notice: Subject to any disclaimer, the term of this patent is extended or adjusted under 35 U.S.C. 154(b) by 163 days.

(21) Appl. No.: 16/190,242

(22) Filed: Nov. 14, 2018

Related U.S. Application Data

(60) Provisional application No. 62/586,350, filed on Nov. 15, 2017.

(51) Int. Cl.
*A01K 13/00* (2006.01)
*A46B 9/02* (2006.01)
*A61D 7/00* (2006.01)

(52) U.S. Cl.
CPC .............. *A01K 13/003* (2013.01); *A46B 9/02* (2013.01); *A46B 2200/1093* (2013.01); *A61D 7/00* (2013.01)

(58) Field of Classification Search
CPC ........ A01K 13/00; A01K 13/003; A46B 9/02; A46B 2200/1093; A61D 7/00
See application file for complete search history.

(56) References Cited

U.S. PATENT DOCUMENTS

| 84,860 A | 12/1868 | Craig |
| 434,145 A | 8/1890 | Gamble |
| 598,593 A | 2/1898 | Christensen et al. |
| 628,722 A | 7/1899 | McCarter |
| 681,740 A | 9/1901 | Sanonse |
| 990,314 A * | 4/1911 | Taylor ...................... A46B 9/02 15/160 |
| 1,004,404 A * | 9/1911 | Fordyce .................. B26B 13/24 30/233.5 |
| 1,115,104 A * | 10/1914 | Prikla ..................... B26B 13/24 7/136 |
| 1,430,512 A * | 9/1922 | Langlais ................. B26B 13/24 30/233.5 |

(Continued)

FOREIGN PATENT DOCUMENTS

| CA | 2828232 A1 * | 8/2012 | .......... A01K 13/003 |
| CN | 105082198 * | 5/2014 | |

(Continued)

*Primary Examiner* — Monica L Barlow
*Assistant Examiner* — Aaron M Rodziwicz

(57) ABSTRACT

A device for assisting the application of medicaments to pets includes first and second elongated members. Each elongated member includes a proximal end and a distal end, a handle portion extending between the proximal end and the distal end, and comb teeth extending between the proximal end and the distal end. The proximal end of the second elongated member and the proximal end of the first elongated member are pivotally attached to one another. The comb teeth of the first and second elongated members extend in the same direction perpendicular to a plane in which the first and second members pivot relative to each other. The handle portions extend in the same or parallel plane in which the first and second members pivot relative to one another. The device is used to part the hair of the pet so that the medicament can be applied directly to the pet's skin.

9 Claims, 5 Drawing Sheets

(56) References Cited

U.S. PATENT DOCUMENTS

| | | | | |
|---|---|---|---|---|
| 1,726,390 A * | 8/1929 | Erhard | .................... | B26B 13/24 |
| | | | | 7/136 |
| 2,614,281 A * | 10/1952 | Clark | .................... | A46B 9/02 |
| | | | | 15/160 |
| 2,677,179 A * | 5/1954 | Servilla | .................... | B26B 13/10 |
| | | | | 30/256 |
| 3,457,928 A * | 7/1969 | Kurshenoff | ............ | A45D 24/26 |
| | | | | 132/113 |
| 3,914,866 A | 10/1975 | Applegate | | |
| 4,056,863 A * | 11/1977 | Gunjian | .................... | A46B 3/18 |
| | | | | 15/160 |
| 4,213,423 A | 7/1980 | Bryan et al. | | |
| 4,605,026 A * | 8/1986 | Nolin | .................... | A45D 24/24 |
| | | | | 132/112 |
| 4,902,154 A | 2/1990 | Valenza | | |
| 4,958,596 A * | 9/1990 | Belan | .................... | A01K 13/001 |
| | | | | 119/603 |
| D314,248 S * | 1/1991 | Jokinen | .................... | D28/25 |
| 5,012,830 A * | 5/1991 | Vaccaro | .................... | A45D 24/36 |
| | | | | 132/124 |
| 5,024,243 A * | 6/1991 | Snyder | .................... | A45D 19/02 |
| | | | | 132/112 |
| D333,764 S * | 3/1993 | Osvaldo | .................... | D8/57 |
| 5,222,268 A * | 6/1993 | Snodgrass | ............ | A46B 5/0012 |
| | | | | 15/105 |
| 5,259,114 A * | 11/1993 | Shorter | .................... | B26B 13/24 |
| | | | | 132/148 |
| 5,284,167 A * | 2/1994 | Gill | .................... | A45D 8/34 |
| | | | | 132/129 |
| 5,289,833 A * | 3/1994 | McDonald | ............ | A45D 24/26 |
| | | | | 132/112 |
| 5,319,824 A * | 6/1994 | Cook | .................... | A46B 5/0075 |
| | | | | 15/106 |
| 5,325,878 A | 7/1994 | McKay | | |
| 5,794,348 A * | 8/1998 | Scott | .................... | B26B 21/12 |
| | | | | 30/195 |
| 5,884,402 A * | 3/1999 | Talavera | .................... | B26B 19/00 |
| | | | | 30/124 |
| 5,975,089 A * | 11/1999 | Simon | .................... | A45D 24/26 |
| | | | | 132/112 |
| 6,047,703 A * | 4/2000 | Paglericcio | ............ | A45D 19/02 |
| | | | | 132/112 |
| 6,053,180 A * | 4/2000 | Kwan | .................... | A01K 13/00 |
| | | | | 132/118 |
| 6,141,877 A * | 11/2000 | Suetsugu | .................... | B26B 13/24 |
| | | | | 30/195 |
| D461,280 S * | 8/2002 | Swaner | .................... | D28/20 |
| D462,808 S * | 9/2002 | Swaner | .................... | D28/20 |
| 6,457,476 B1 * | 10/2002 | Elmer | .................... | A45D 19/02 |
| | | | | 132/114 |
| 6,526,663 B1 | 3/2003 | Simmons et al. | | |
| 6,976,495 B2 | 12/2005 | Vena et al. | | |
| D602,754 S * | 10/2009 | Bellisario | .................... | D8/57 |
| D611,792 S * | 3/2010 | Bellisario | .................... | D8/57 |
| 7,926,185 B2 * | 4/2011 | Sugawara | .................... | A45D 24/10 |
| | | | | 30/195 |
| 9,072,355 B1 * | 7/2015 | Magnani | .................... | A45D 8/20 |
| D829,522 S * | 10/2018 | Noriyuki | .................... | D8/57 |
| 2006/0032458 A1 | 2/2006 | Hutchinson et al. | | |
| 2006/0191554 A1 * | 8/2006 | Lafuente | ............ | A46B 15/0051 |
| | | | | 132/224 |
| 2007/0130780 A1 * | 6/2007 | Hobbs | .................... | B26B 13/08 |
| | | | | 30/195 |
| 2008/0072437 A1 * | 3/2008 | Michel | .................... | B26B 13/24 |
| | | | | 30/201 |
| 2008/0201962 A1 | 8/2008 | Sugawara | | |
| 2008/0283075 A1 * | 11/2008 | Vance | .................... | A45D 24/04 |
| | | | | 132/200 |
| 2009/0044411 A1 | 2/2009 | Cotant | | |
| 2009/0218252 A1 * | 9/2009 | Michel | .................... | B26B 19/3806 |
| | | | | 206/581 |
| 2010/0086577 A1 * | 4/2010 | Munoz | .................... | A45D 1/18 |
| | | | | 424/405 |
| 2010/0087790 A1 | 4/2010 | Hurwitz | | |
| 2011/0092922 A1 | 4/2011 | Trompen et al. | | |
| 2014/0331504 A1 * | 11/2014 | Michel | .................... | B26B 13/24 |
| | | | | 30/233.5 |
| 2016/0050997 A1 * | 2/2016 | Ott | .................... | A41G 5/008 |
| | | | | 132/148 |
| 2016/0309870 A1 * | 10/2016 | Pao | .................... | A46B 9/023 |
| 2016/0330937 A1 * | 11/2016 | Peschardt | ............ | A01K 13/00 |

FOREIGN PATENT DOCUMENTS

| | | | | |
|---|---|---|---|---|
| CN | 204860113 | * | 8/2015 | |
| JP | 2005224355 A | * | 8/2005 | |
| JP | 2007215686 A | * | 8/2007 | |
| JP | 2007244548 A | * | 9/2007 | |
| JP | 2008104613 A | * | 5/2008 | |
| JP | 2008104663 A | * | 5/2008 | |
| JP | 2009005816 A | * | 1/2009 | |
| JP | 2010022524 A | * | 2/2010 | |
| JP | 2016209209 A | * | 12/2016 | |
| JP | 2017140282 A | * | 8/2017 | ............ B26B 13/08 |
| JP | 2019155069 A | * | 9/2019 | |
| KR | 468492 | * | 8/2013 | |
| KR | 20140020046 A | * | 2/2014 | |
| SU | 1097308 | * | 6/1984 | |
| WO | WO-2015105508 A1 | * | 7/2015 | ............ A01K 13/00 |
| WO | WO-2016014769 A2 | * | 1/2016 | ............ A01K 17/00 |

* cited by examiner

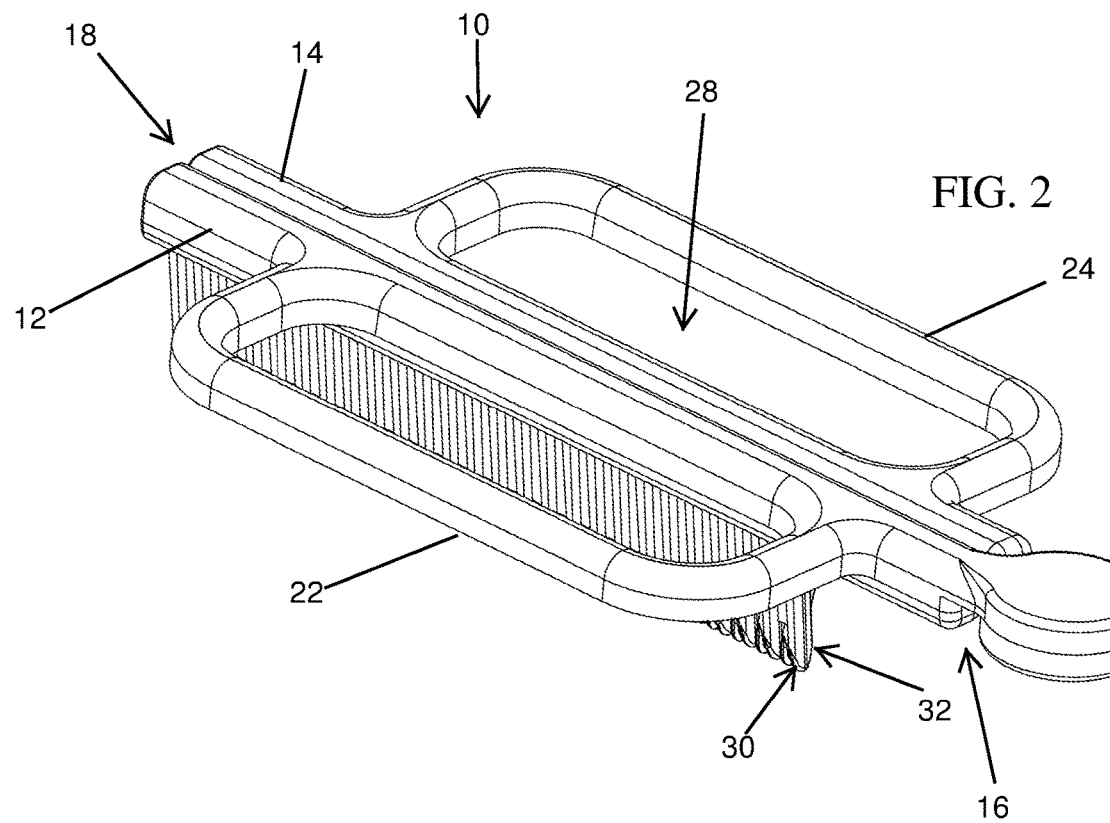
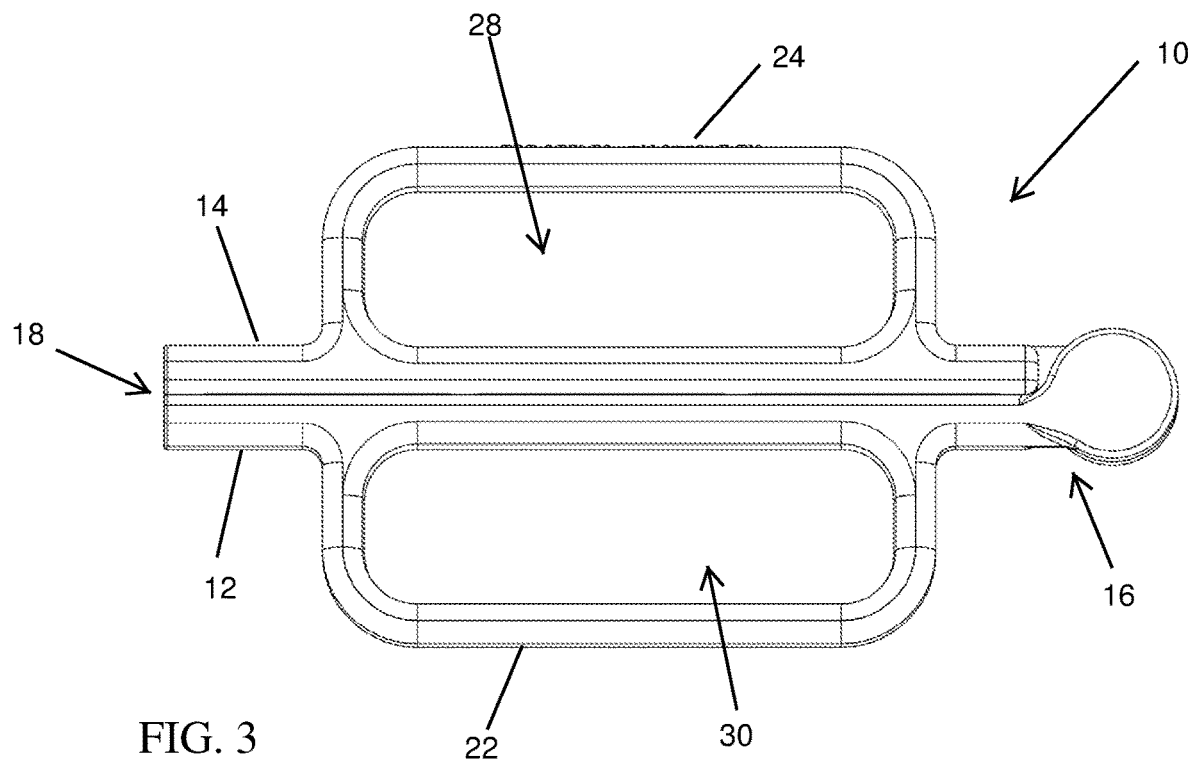

DEVICE FOR ASSISTING APPLICATION OF MEDICAMENTS TO PETS

CROSS-REFERENCE TO RELATED APPLICATION

This application claims the benefit and is a non-provisional of similarly entitled U.S. Provisional Patent Application No. 62/586,350 filed on Nov. 15, 2017, which is hereby incorporated herein by reference.

BACKGROUND OF INVENTION

The present invention relates to devices and methods of applying medicaments to pets. More particularly, the present invention relates to a hand-operated tool, and method of using the same, that assists in applying insecticide and antiparasitic agent medication to dogs and cats.

The hand-operated tool of the present invention assists pet owners in applying insecticides and antiparasitic agent medicaments to their pets for flea and tick prevention. For example, there exists in the market a variety of products that are applied to the scalps of dogs and cats for the prevention of fleas and ticks. Examples of products that contain insecticide and antiparasitic agent medicaments include Frontline® and FrontlinePlus® as made available through Merial Corporation. Once the medicament is applied, the active ingredients contained therein are stored in the oil glands of the pet's skin. The medicament then self-distributes continuously for 1 month pet's hair and skin through the hair follicles. Fleas or ticks that come in contact with the pet are rendered dead.

Generally, the medicaments are made available in one-use containers. To apply the medicament to the skin of the pet, the container is opened and the medicament is applied directly to the skin of the pet, preferably along the backbone so that the pet is unable to come into contact therewith through licking. In instances where the dog or cat has long hair, the owner must be careful to spread the hair apart so that the medicament can be applied directly to the skin of the pet. Problems arise, however, when oftentimes the medicament is collected by the hair, not coming into contact with the skin, resulting in the pet not receiving the full treatment needed for the 1-month medication interval. There therefore exists a need in the art provide a means whereby the medicament can be applied to the skin of the pet in an efficient manner so that the medicament is applied directly the skin of the pet, while avoiding unnecessary contact with the hair of the pet. There is nothing in the marketplace today to address this problem.

BRIEF SUMMARY OF INVENTION

The present invention includes a device for assisting the application of medicaments to pets. The device includes first and second elongated members pivotally attached to one another. Each elongated member includes a proximal end and a distal end, a handle portion extending between the proximal end and the distal end, and comb teeth extending between the proximal end and the distal end. The proximal end of the second elongated member and the proximal end of the first elongated member are pivotally attached to one another. The comb teeth of the first and second elongated members extend in the same direction perpendicular to a plane in which the first and second members pivot relative to each other. The handle portions extend in the same or parallel plane in which the first and second members pivot relative to one another.

In operation, a user takes hold of each handle by placing a thumb through one handle and at least one finger in the other handle to position the first and second elongated members in either an open or closed position, the latter occurring when the elongated members are brought into contact with one another. While in the closed position, the teeth of each comb are placed against the scalp of the pet, and the handles are then manipulated by the user to open position, whereupon each comb urges the hair of the pet away from a central axis of the device. Upon so doing, along the length of the elongated members the skin of the pet is exposed as an open area, and an applicator containing the medicament can then be positioned to apply the medicament to the open area of skin. Once the medicament has been applied, the handles can be manipulated to bring the elongated members towards the closed position, whereupon the device can be removed from the pet.

BRIEF DESCRIPTION OF DRAWINGS

FIG. 2 is a perspective view of the device of the present invention in a closed position.

FIG. 3 is a top view of the device of the present invention in the closed position.

DESCRIPTION OF INVENTION

Figure 1:
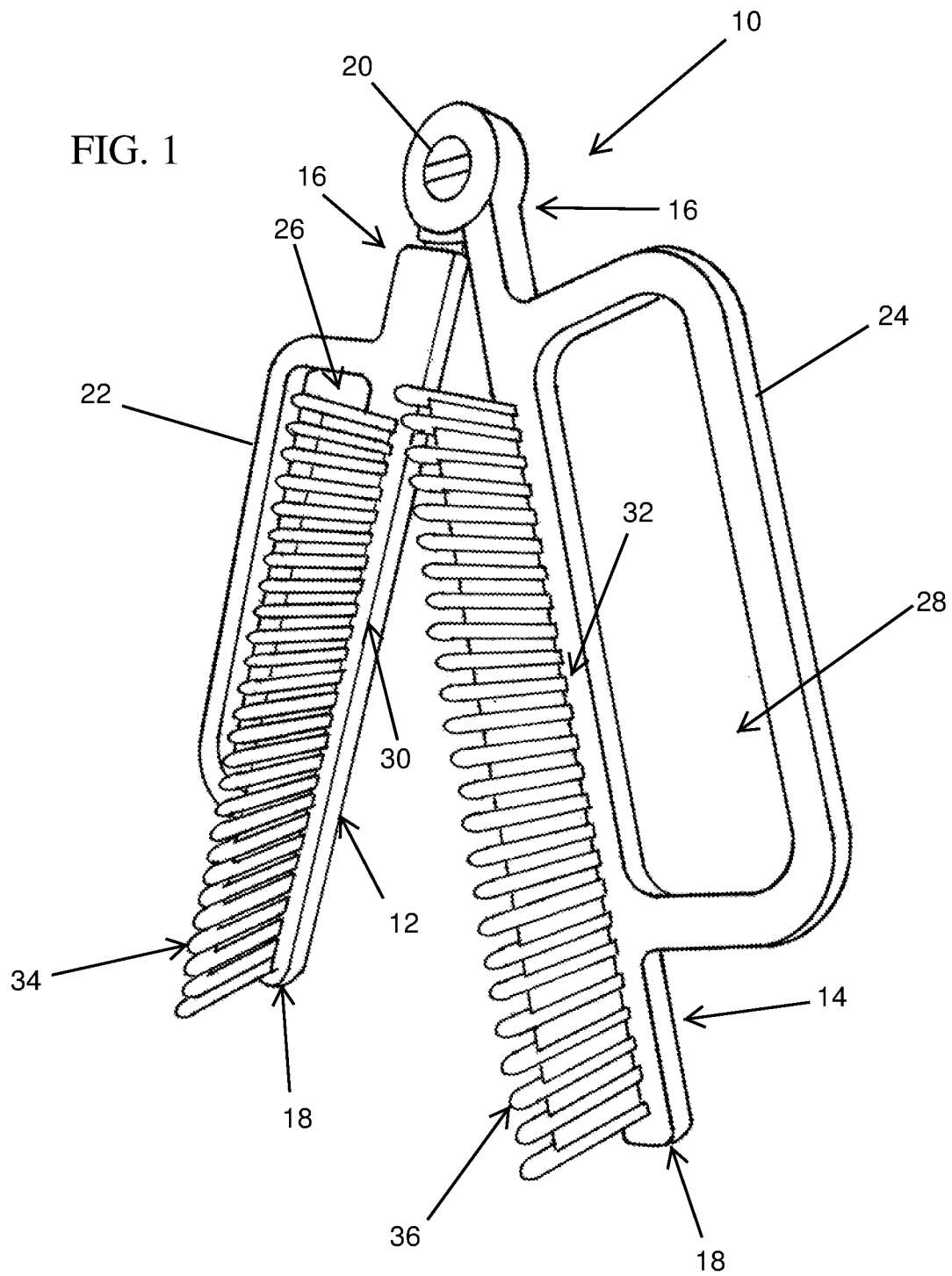
FIG. 1 is a perspective view of the device of the present invention.

The present invention is generally directed at a hand-operated tool that assists pet owners in applying insecticide and antiparasitic agent medicaments to pets for flea and tick prevention. Referring to FIGS. 1 through 5, the hand-operated tool of the present invention is generally indicated at 10. The device 10 includes a first elongated member 12 and a second elongated member 14. Each elongated member has a proximal end 16 and an opposing distal end 18. The elongated members 12, 14 are pivotally connected to one another at the respective proximal ends 16 by means of a rivet 20 such that each elongated member 12, 14 may be manipulated to pivot relative to one another in a single plane. Each elongated member 12, 14 contains a handle, 22 and 24, respectively, extending therefrom, preferably in the same plane with which the pivoting action is accomplished. However, it is within the scope of the present invention to position the handles 22, 24 between 0 and 90 degrees relative to the length of the respective elongated member. Each handle 22, 24 forms an aperture, 26 and 28, respectively, such that a user is able to insert within the aperture 26, 28 a thumb or fingers to manipulate the device 10, as best illustrated in FIG. 6.

Figure 4:
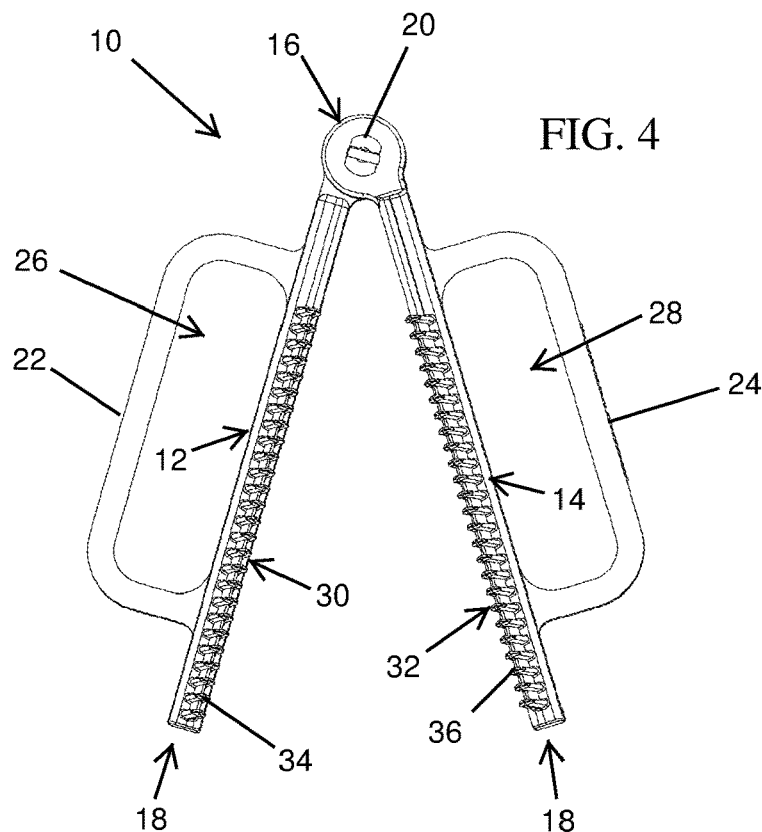
FIG. 4 is a top view of the device of the present invention in an open position.
Figure 5:
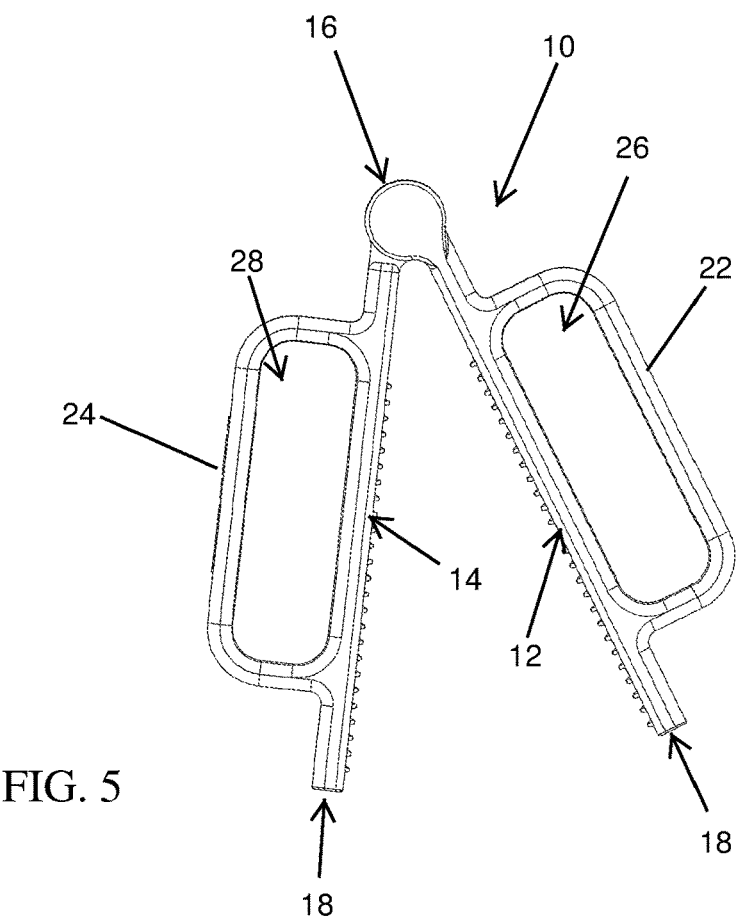
FIG. 5 is a bottom view of the device of the present invention in the open position.

Turning back again to FIGS. 1 through 5, extending from each handle 22, 24, is a section of comb, 30 and 32, respectively. Each comb 30, 32 extends perpendicular to the respective elongated member 12, 14, which is perpendicular to the plane in which the elongated members 12, 14 pivot relative to one another. Each section of comb 30, 32 includes a plurality of teeth, 34 and 36, respectively, extending parallel to one another. The pivoting action of the elongated members 12, 14 permits the elongated members 12, 14, and thus the comb sections 30, 32, to be positioned between a first closed position, as best illustrated in FIGS. 2 and 3, and a second open position, as best illustrated in FIGS. 1, 4 and 5. In the first closed position, the elongated members 12, 14, and subsequently each comb section 30, 32, are positioned proximate to one another, with the comb sections 30, 32 being parallel to one another. In the second open position, the elongated members 12, 14, and subsequently each comb section 30, 32, are pivoted away from one another.

Figure 6:
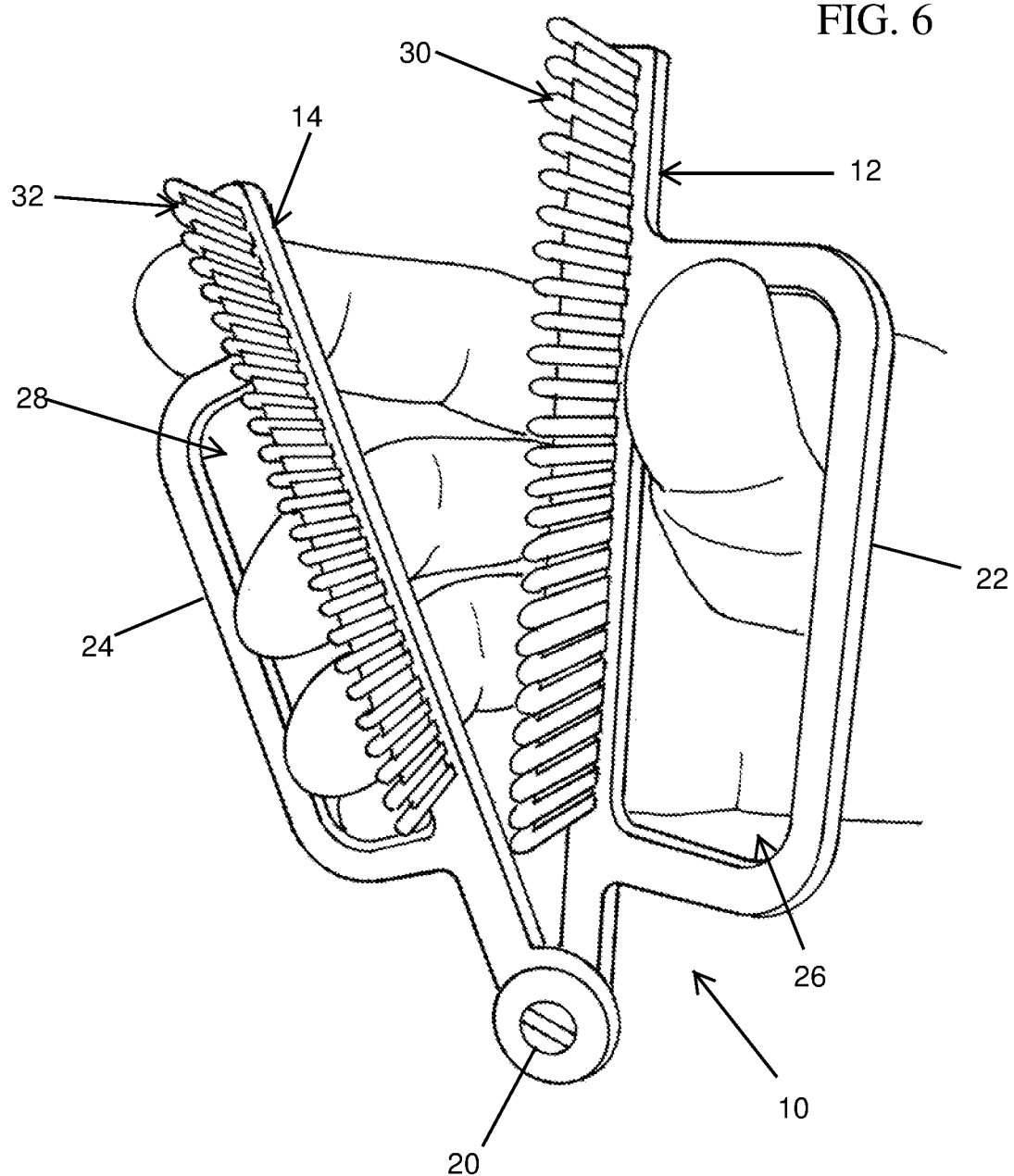
FIG. 6 is a perspective view of the device of the present invention being held by a user in the open position.
Figure 7:
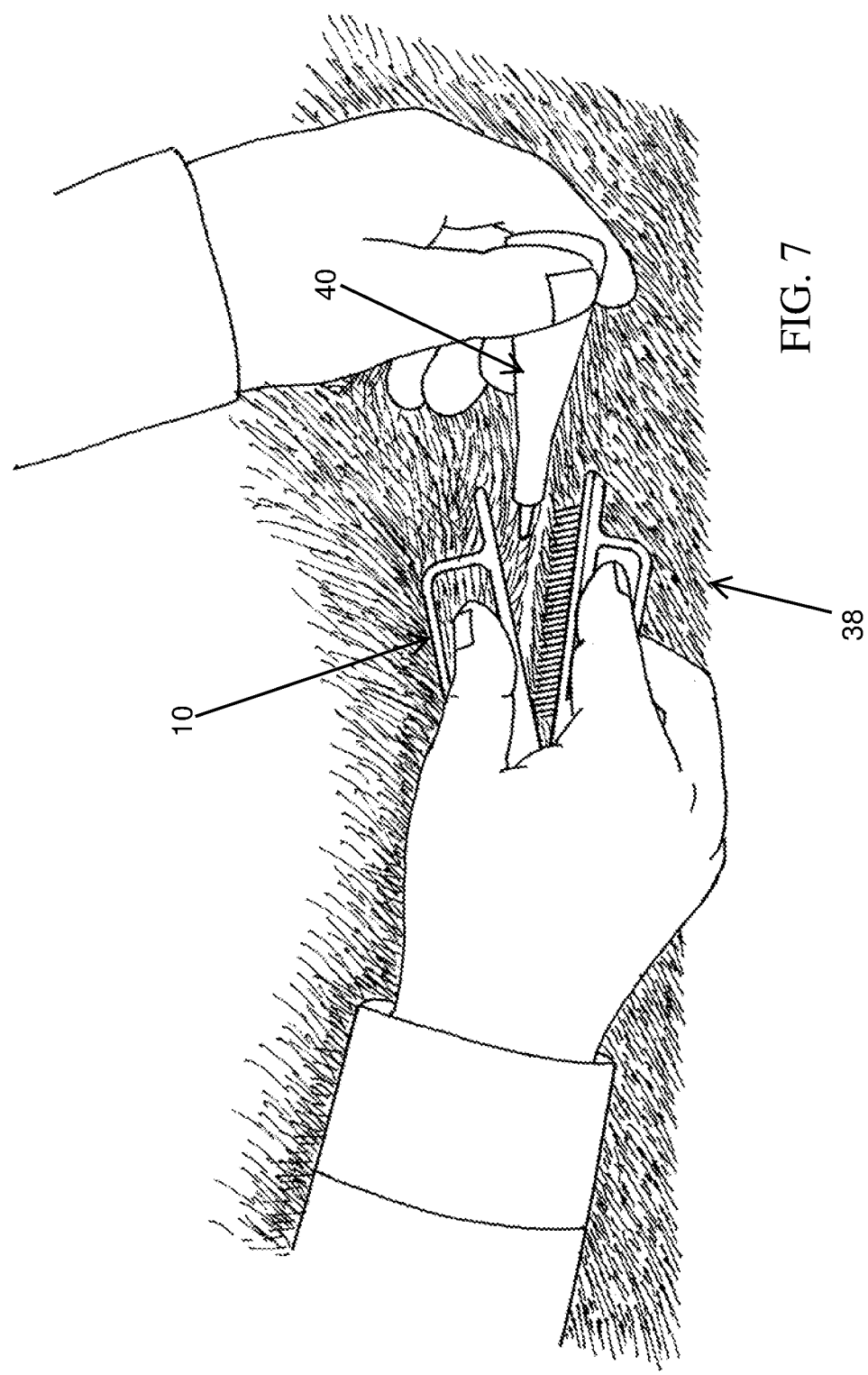
FIG. 7 is a perspective view of the device of the present invention while being used on a pet to apply medicaments.

In operation, a user takes hold of each handle 22, 24 by inserting a thumb within, for example, aperture 26 of handle 22 and at least one finger within aperture 28 of handle 24, as illustrated in FIG. 6. The user is then allowed to manipulate and pivot the elongated members 12, 14 between either the first closed position or the second open position, the former occurring when the elongated members 12, 14 and respective combs 30, 32 are brought into contact with one another, and the latter occurring when the when the elongated members 12, 14 and respective combs 30, 32 are positioned apart from one another. While in the first closed position, the teeth 34, 36 of each comb 30, 32 are placed against the scalp of the pet 38. The handles 22, 24 are then manipulated by the user to the second open position, whereupon the teeth 34, 36 of each comb 30, 32 urges the hair of the pet 38 away from a central axis of the device 10, as illustrated in FIG. 7. Upon so doing, along the length of the combs 30, 32 the skin of the pet 38 is exposed as an open area. An applicator 40 containing the medicament can then be positioned between elongated members 12, 14 while in the second open position, and the medicament applied to the open area of skin without the pet's hair encumbering the same. Once the medicament has been applied to open area of the pet's skin, the handles 12, 14 can be manipulated by the back towards the first closed position, whereupon the device 10 can be removed from the pet 38. The process can be repeated on another area of the pet, if necessary.

Although the present invention has been described with reference to preferred embodiments, workers skilled in the art will recognize that changes may be made in form and detail without departing from the spirit and scope of the invention.

The invention claimed is:

1. A device for assisting the application of medicaments to pets, the device comprising:
   a first elongated member having lengthwise a proximal end and a distal end, the first elongated member having comb teeth extending therefrom between the proximal end and the distal end;
   a first aperture formed by a handle portion extending from the first elongated member, the first aperture positioned proximate the comb teeth of the first elongated member;
   a second elongated member having lengthwise a proximal end and a distal end, the second elongated member having comb teeth extending therefrom between the proximal end and the distal end;
   a second aperture formed by a handle portion extending from the second elongated member, the second aperture positioned proximate the comb teeth of the second elongated member, wherein the second elongated member is pivotally attached to the first elongated member, wherein the comb teeth of the first and second elongated members extend in the same direction perpendicular to a plane in which the first and second members pivot relative to one another, whereby the first aperture and the second aperture allow grasping of the device by the user in order to manipulate the first elongated member relative to the second elongated member.

2. The device of claim 1, wherein the proximal end of the second elongated member pivotally attaches to the proximal end of the first elongated member.

3. The device of claim 1 wherein the handle portions of the first and the second elongated member each extend therefrom between the proximal end and the distal end.

4. The device of claim 3 wherein the handle portions extend in the same or parallel plane in which the first and second members pivot relative to one another.

5. A device for assisting the application of medicaments to pets, the device comprising:
   a first elongated member having:
      a proximal end;
      a distal end lengthwise opposing the proximal end;
      comb teeth extending outwardly between the proximal end and the distal end; and
      a handle portion extending between the proximal end and the distal end perpendicular and adjacent to the comb teeth; and
   a second elongated member having:
      a proximal end;
      a distal end lengthwise opposing the proximal end;
      comb teeth extending outwardly between the proximal end and the distal end; and
      a handle portion extending between the proximal end and the distal end perpendicular and adjacent to the comb teeth, wherein the proximal end of the second elongated member and the proximal end of the first elongated member are pivotally attached to one another, wherein the comb teeth of the first and second elongated members extend in the same direction perpendicular to a plane in which the first and second members pivot relative to each other.

6. The device of claim 5 wherein the handle portions extend in the same or parallel plane in which the first and second members pivot relative to one another.

7. The device of claim 5 and further comprising:
   a first aperture formed by the handle portion extending from the first elongated member, the first aperture positioned proximate the comb teeth of the first elongated member; and
   a second aperture formed by the handle portion extending from the second elongated member, the second aperture positioned proximate the comb teeth of the second elongated member, whereby the first aperture and the second aperture allow grasping of the device by the user in order to manipulate the first elongated member relative to the second elongated member.

8. A device for assisting the application of medicaments to pets, the device consisting essentially of:
   a first elongated member having:
      a proximal end;
      a distal end lengthwise opposing the proximal end;
      a handle portion extending between the proximal end and the distal end; and
      comb teeth extending outwardly perpendicular and adjacent to the handle between the proximal end and the distal end; and
   a second elongated member having:
      a proximal end;
      a distal end lengthwise opposing the proximal end;

a handle portion extending between the proximal end and the distal end; and comb teeth extending outwardly perpendicular and adjacent to the handle between the proximal end and the distal end, wherein the proximal end of the second elongated member and the proximal end of the first elongated member are pivotally attached to one another, wherein the comb teeth of the first and second elongated members extend in the same direction perpendicular to a plane in which the first and second members pivot relative to each other, wherein the handle portions extend in the same or parallel plane in which the first and second members pivot relative to one another.

9. The device of claim 8 and further comprising:

a first aperture formed by the handle portion extending from the first elongated member, the first aperture positioned proximate the comb teeth of the first elongated member; and a second aperture formed by the handle portion extending from the second elongated member, the second aperture positioned proximate the comb teeth of the second elongated member, whereby the first aperture and the second aperture allow grasping of the device by the user in order to manipulate the first elongated member relative to the second elongated member.

* * * * *